US012585242B2

(12) United States Patent
FrantzDale et al.

(10) Patent No.: US 12,585,242 B2
(45) Date of Patent: Mar. 24, 2026

(54) SUPPORT STRUCTURES TECHNIQUES FOR ADDITIVE FABRICATION AND RELATED SYSTEMS AND METHODS

(71) Applicant: Formlabs, Inc., Somerville, MA (US)

(72) Inventors: Benjamin FrantzDale, Harvard, MA (US); Samuel Wainwright, North Andover, MA (US)

(73) Assignee: Formlabs, Inc., Somerville, MA (US)

( * ) Notice: Subject to any disclaimer, the term of this patent is extended or adjusted under 35 U.S.C. 154(b) by 550 days.

(21) Appl. No.: 17/990,223

(22) Filed: Nov. 18, 2022

(65) Prior Publication Data

US 2023/0161322 A1     May 25, 2023

Related U.S. Application Data

(60) Provisional application No. 63/281,229, filed on Nov. 19, 2021.

(51) Int. Cl.
*G05B 19/4099*     (2006.01)
*G06T 17/00*     (2006.01)

(52) U.S. Cl.
CPC .......... *G05B 19/4099* (2013.01); *G06T 17/00* (2013.01); *G05B 2219/49023* (2013.01); *G06T 2200/24* (2013.01)

(58) Field of Classification Search
CPC ...... G05B 19/4099; G05B 2219/49007; G05B 2219/49023; G06T 17/00; G06T 2200/24; B33Y 10/00; B33Y 50/00; B29C 64/386; B29C 64/40
See application file for complete search history.

(56) References Cited

U.S. PATENT DOCUMENTS

| | | | | |
|---|---|---|---|---|
| 7,761,803 B2 * | 7/2010 | Parker | ..................... | G06F 3/011 |
| | | | | 700/214 |
| 9,690,274 B1 * | 6/2017 | Markov | ................ | B33Y 50/02 |
| 2014/0303942 A1 * | 10/2014 | Wighton | ............ | B29C 33/3842 |
| | | | | 703/1 |
| 2016/0107234 A1 * | 4/2016 | Craeghs | ................. | B22F 10/47 |
| | | | | 264/401 |
| 2020/0307108 A1 * | 10/2020 | FrantzDale | ............. | G06F 30/17 |
| 2022/0118713 A1 * | 4/2022 | Vignat | .................... | B29C 64/40 |
| 2022/0143925 A1 * | 5/2022 | Schalk | .................... | B22F 10/73 |

FOREIGN PATENT DOCUMENTS

| | | | | |
|---|---|---|---|---|
| WO | WO-2015092376 A1 * | 6/2015 | .......... | B29C 64/386 |
| WO | WO-2019099377 A1 * | 5/2019 | ............. | B22F 10/47 |

* cited by examiner

*Primary Examiner* — Scott T Baderman
*Assistant Examiner* — Mario M Velez-Lopez
(74) *Attorney, Agent, or Firm* — Michael J. Attisha; Greenberg Traurig, LLP

(57) ABSTRACT

Techniques are described for generating a support structure that connects to a part while avoiding connecting to regions that include one or more less desirable features, such as at edges, corners and/or high detail regions. A computing device may be configured to identify regions of the surface of a part that contain less desirable surface features, and exclude and/or disfavor those regions for connection to a support structure when generating the support structure. In some embodiments, regions containing less desirable surface features can be defined by a user, such as via a graphical user interface displaying a three-dimensional (3D) representation of a part to be fabricated.

18 Claims, 15 Drawing Sheets

200

100

102

104

106

110

Model 401

Edge Area 402

Corner Area 404

Model 403

Edge Area 402

Corner Area 404

Model 405

High Mesh Density Area 406

Printed
Part 409

Model 407

High Mesh Density
Area 408

Supports 410

Rafts 412

Imported Model
506

Model Viewer
502

Model Control
504

Support Generation
Button 510

Support Affordance
505

Support Control
Panel 508

700⌐

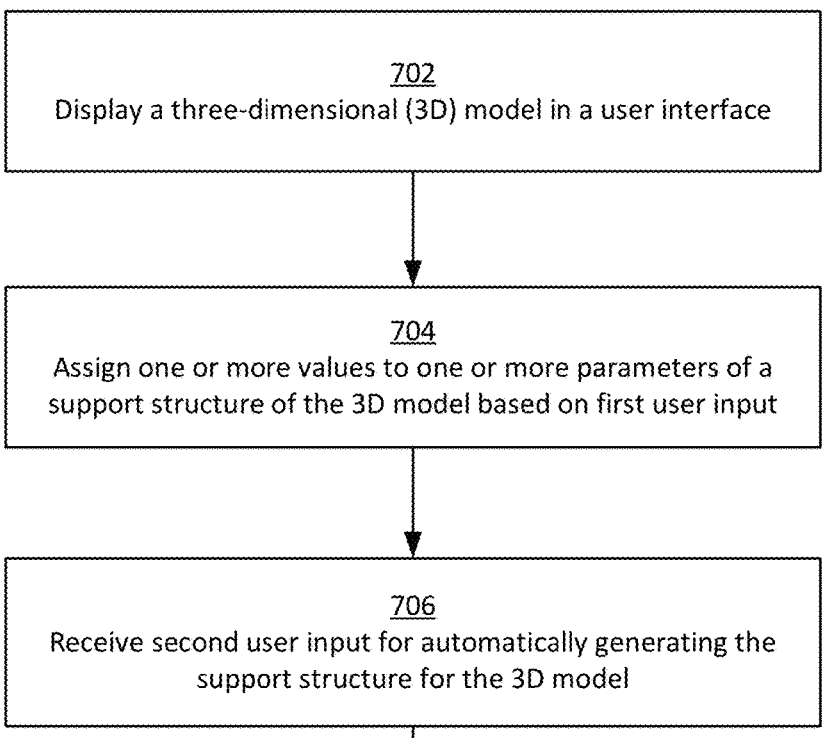

702
Display a three-dimensional (3D) model in a user interface

704
Assign one or more values to one or more parameters of a support structure of the 3D model based on first user input

706
Receive second user input for automatically generating the support structure for the 3D model In response to receiving the second user input 708

710
Determine one or more surface regions of the three-dimensional model that satisfy support tip generation criteria

712
Generate the support structure with support tips contacting the one or more surface regions

714
Display the support structure and the 3D model in the user interface

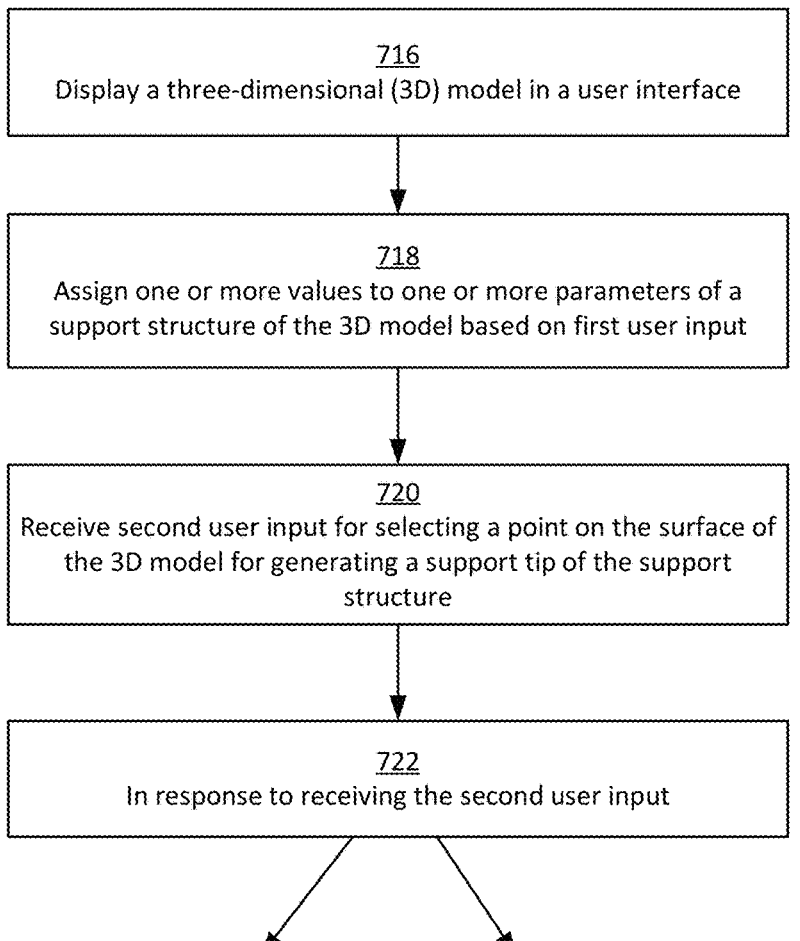

716
Display a three-dimensional (3D) model in a user interface

718
Assign one or more values to one or more parameters of a support structure of the 3D model based on first user input

720
Receive second user input for selecting a point on the surface of the 3D model for generating a support tip of the support structure

722
In response to receiving the second user input

724
In accordance with a determination that the selected point is located in a surface region that satisfies support tip generation criteria:

726
Marking the selected point as a valid location for generating a support tip

728
In accordance with a determination that the selected point is located in a surface region that does not satisfy the support tip generation criteria:

730
Forgo marking the selected point as a valid location for generating a support tip

732
Generate a message via the user interface indicating that the support tip cannot be generated at the selected point

FIG. 7B

820
Additive Fabrication Device

815

810

800

SUPPORT STRUCTURES TECHNIQUES FOR ADDITIVE FABRICATION AND RELATED SYSTEMS AND METHODS

CROSS-REFERENCE TO RELATED APPLICATIONS

The present application claims the benefit under 35 U.S.C. § 119(e) of U.S. Provisional Patent Application No. 63/281,229, filed Nov. 19, 2021, titled "Techniques for Providing Support Structure in Additive Fabrication and Related Systems and Methods," which is hereby incorporated by reference in its entirety.

FIELD OF INVENTION

The present invention relates generally to systems and methods for providing and evaluating support structures, including support structures that are suitable for use in additive fabrication.

BACKGROUND

Additive fabrication, e.g., 3-dimensional (3D) printing, provides techniques for fabricating objects, typically by causing portions of a building material to solidify at specific locations. Additive fabrication techniques may include stereolithography, selective or fused deposition modeling, direct composite manufacturing, laminated object manufacturing, selective phase area deposition, multi-phase jet solidification, ballistic particle manufacturing, particle deposition, laser sintering or combinations thereof. Many additive fabrication techniques build parts by forming successive layers, which are typically cross-sections of the desired object. Typically each layer is formed such that it adheres to either a previously formed layer or a substrate upon which the object is built.

SUMMARY

According to some aspects, a computer-implemented method is provided of generating a support structure for an object to be fabricated by an additive fabrication device, the object represented by a 3D model, the method comprising using at least one processor identifying one or more surface regions of the 3D model that satisfy one or more support tip generation criteria, wherein the one or more support tip generation criteria include a first support tip generation criterion that is satisfied if the one or more surface regions do not include an edge area (e.g., the region does not include any sharp edges or points), generating a 3D model representing a support structure comprising one or more support tips that contact the one or more surface regions of the 3D model, wherein the support structure does not contact surface regions of the 3D model other than the one or more surface regions that satisfied the one or more support tip generation criteria (In some embodiments, the support structure includes a base (or raft), support trunk standing on the base, and support tips connecting surface of the three-dimensional model to the support trunk), and displaying the support structure and the 3D model in a user interface.

According to some aspects, at least one non-transitory computer-readable medium is provided comprising instructions that, when executed by at least one processor, perform a method of generating a support structure for an object to be fabricated by an additive fabrication device, the object represented by a 3D model, the method comprising identifying one or more surface regions of the 3D model that satisfy one or more support tip generation criteria, wherein the one or more support tip generation criteria include a first support tip generation criterion that is satisfied if the one or more surface regions do not include an edge area (e.g., the region does not include any sharp edges or points), generating a 3D model representing a support structure comprising one or more support tips that contact the one or more surface regions of the 3D model, wherein the support structure does not contact surface regions of the 3D model other than the one or more surface regions that satisfied the one or more support tip generation criteria (In some embodiments, the support structure includes a base (or raft), support trunk standing on the base, and support tips connecting surface of the three-dimensional model to the support trunk), and displaying the support structure and the 3D model in a user interface.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

FIG. 7A is a flowchart illustrating an example process for generating support structures for a three-dimensional model subject to automatic support tip generation criterion, according to some embodiments;

FIG. 7B is a flowchart illustrating an example process for generating support structures for a three-dimensional model subject to user-entered support tip generation criterion, according to some embodiments;

DETAILED DESCRIPTION

When producing objects by additive fabrication, a support structure may be fabricated to provide mechanical support to an object during fabrication. The object may contain regions that are not fully supported by previously formed layers, and in such instances there may be no suitable working surface during fabrication that can provide support to those regions. By fabricating a support structure along with the primary object, a working surface can be provided to non-fully supported regions of the object during fabrication. Following the completion of the 3D printing process, the support structure is removed from the object through various post-processing steps.

In many cases, however, support structures can lead to surface deformations or other flaws in the object being fabricated, such as flaws caused by the attachment to the object and/or by the removal of the support structures from the object. The removal process in particular can damage the object in numerous ways, including by leaving part of the support structure behind, removing part of the object with the support structure, damaging the object, or otherwise marring the surface finish of the object. These flaws can be particularly apparent when support structures are fabricated using the same material as the desired object.

Figure 1A:
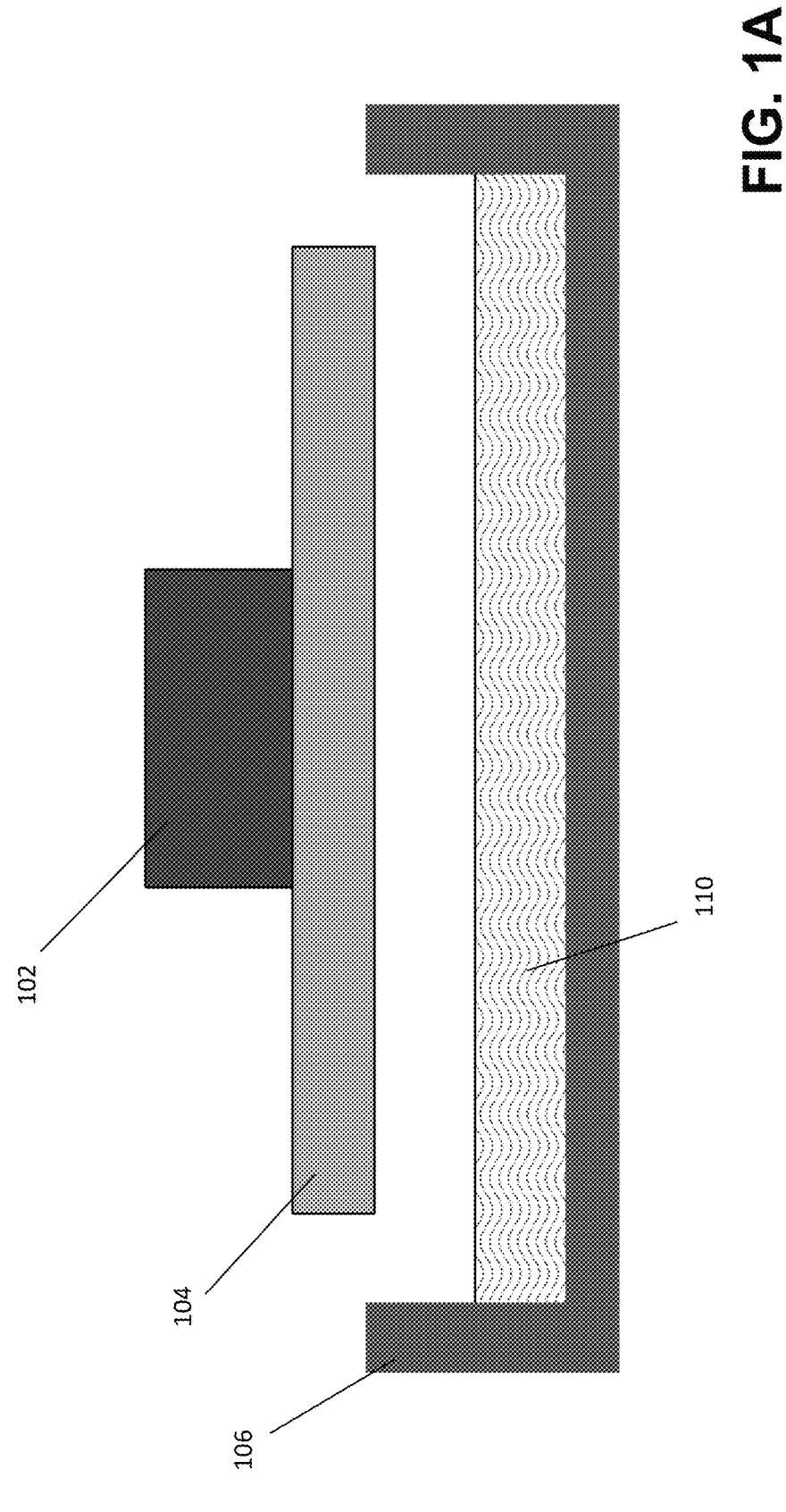
FIGS. 1A-1B depict an illustrative additive fabrication system, according to some embodiments.
Figure 1B:
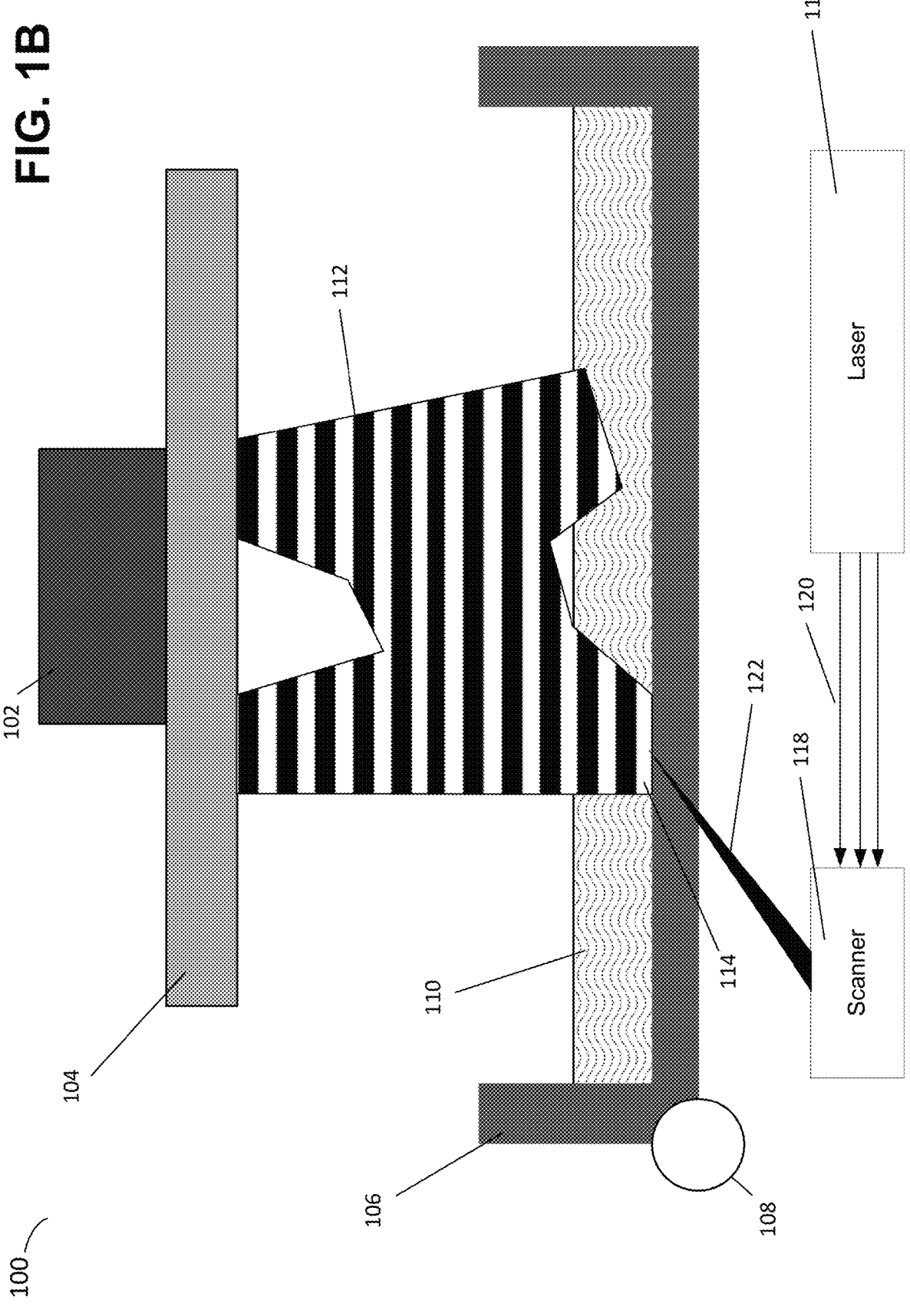

To provide one illustrative example of an additive fabrication process in which the techniques described herein may be employed, FIGS. 1A-1B depict an illustrative additive fabrication system. Illustrative stereolithographic printer 100 forms a part in a downward facing direction on a build platform such that layers of the part are formed in contact with a surface of a container in addition to a previously cured layer or the build platform. In the example of FIGS. 1A-1B, stereolithographic printer 100 comprises build platform 104 attached to a structure 102, a container 106 and liquid photopolymer 110 held by the container. A downward facing build platform 104 opposes the floor of container 106, which contains a liquid photopolymer (e.g., a liquid photopolymer resin) 110. FIG. 1A represents a configuration of stereolithographic printer 100 prior to formation of any layers of a part on build platform 104.

As shown in FIG. 1B, a part 112 may be formed layer-wise, with the initial layer attached to the build platform 104. In FIG. 1B, the layers of the part 112 are each formed from the same material but are shown in alternating shades merely to visually distinguish them in this example. The container's base surface may be transparent to actinic radiation, such that radiation can be targeted at portions of the thin layer of liquid photocurable photopolymer resting on the base surface of the container. Exposure to actinic radiation cures a thin layer of the liquid photopolymer, which causes it to harden. The layer 114 is at least partially in contact with both a previously formed layer and the surface of the container 106 when it is formed. The top side of the cured photopolymer layer typically bonds to either the bottom surface of the build platform 104 or with the previously cured photopolymer layer in addition to the transparent floor of the container. In order to form additional layers of the part subsequent to the formation of layer 114, any bonding that occurs between the transparent floor of the container and the layer must be broken. For example, one or more portions of the surface (or the entire surface) of layer 114 may adhere to the container such that the adhesion must be removed prior to formation of a subsequent layer. In some embodiments, the layer 114 may be separated from the container via some relative motion of the container and part 112, such as sliding the container, rotating the container, moving the build platform away from the container, or combinations thereof.

In order to cure the layer 114 by exposure to actinic radiation, the stereolithographic printer 100 may use the laser 116 and scanner system 118 to produce a laser beam 122. The laser 116 can produce laser light rays 120 which are directed to the scanner system 118. The scanner system 118 directs a laser beam 122 to a location of the build volume. The laser beam 122 may have a spot size comprising a size of the laser beam incident on the location of the build volume. Exposure of a portion of the liquid photopolymer 110 to the laser cures the portion of the liquid photopolymer. For example, when an entire portion of the build volume of layer 114 has been exposed to the laser beam 122, layer 114 of the part 112 may be formed. The scanner system 118 may include any number and type of optical components, such as multiple galvanometers and/or lenses that may be operated to direct the light emitted by laser 116.

Following the curing process, a separation process is typically conducted so as to break any bonds that may have been produced between the cured material of layer 114 and the bottom of container 102. Various techniques may be employed to separate the layers, include rotation and/or sliding the container relative to the build platform. As one example, build platform 104 may be moved away from the container to reposition the build platform for the formation of a new layer and/or to impose separation forces upon any bonds between cured and/or partially cured material and the bottom of the container. In some implementations, the container 106 may be mounted onto a support base such that the container can be moved along a horizontal axis of motion (left or right in FIG. 1B) to introduce additional separation forces.

The illustrative device of FIGS. 1A-1B is provided as one example, and it will be appreciated that the techniques described herein are also applicable to other types of additive fabrication devices, including other stereolithography devices such as those that utilize a container comprising a thin film, and that scan light across the container in various ways. Moreover, the techniques described herein may be applicable to other types of additive fabrication and are not limited to use with stereolithography. For instance, the techniques described herein relate to design and fabrication of support structures and accordingly the techniques may be applicable to any additive fabrication technique or process in which a part may be designed and/or fabricated with a support structure.

Figure 2A:
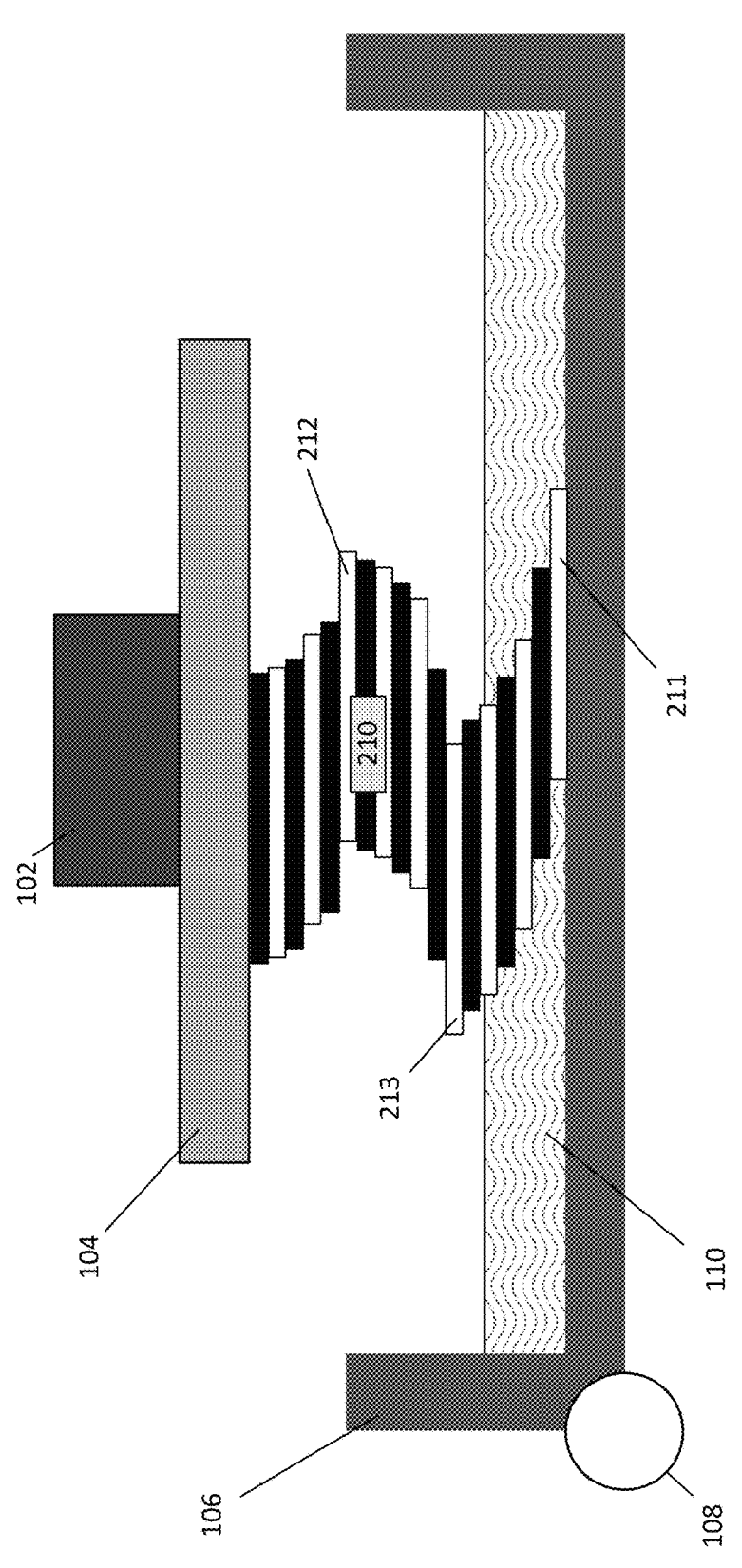
FIGS. 2A-2B depict an illustrative additive fabrication system fabricating a part having overhangs, according to some embodiments.
Figure 2B:
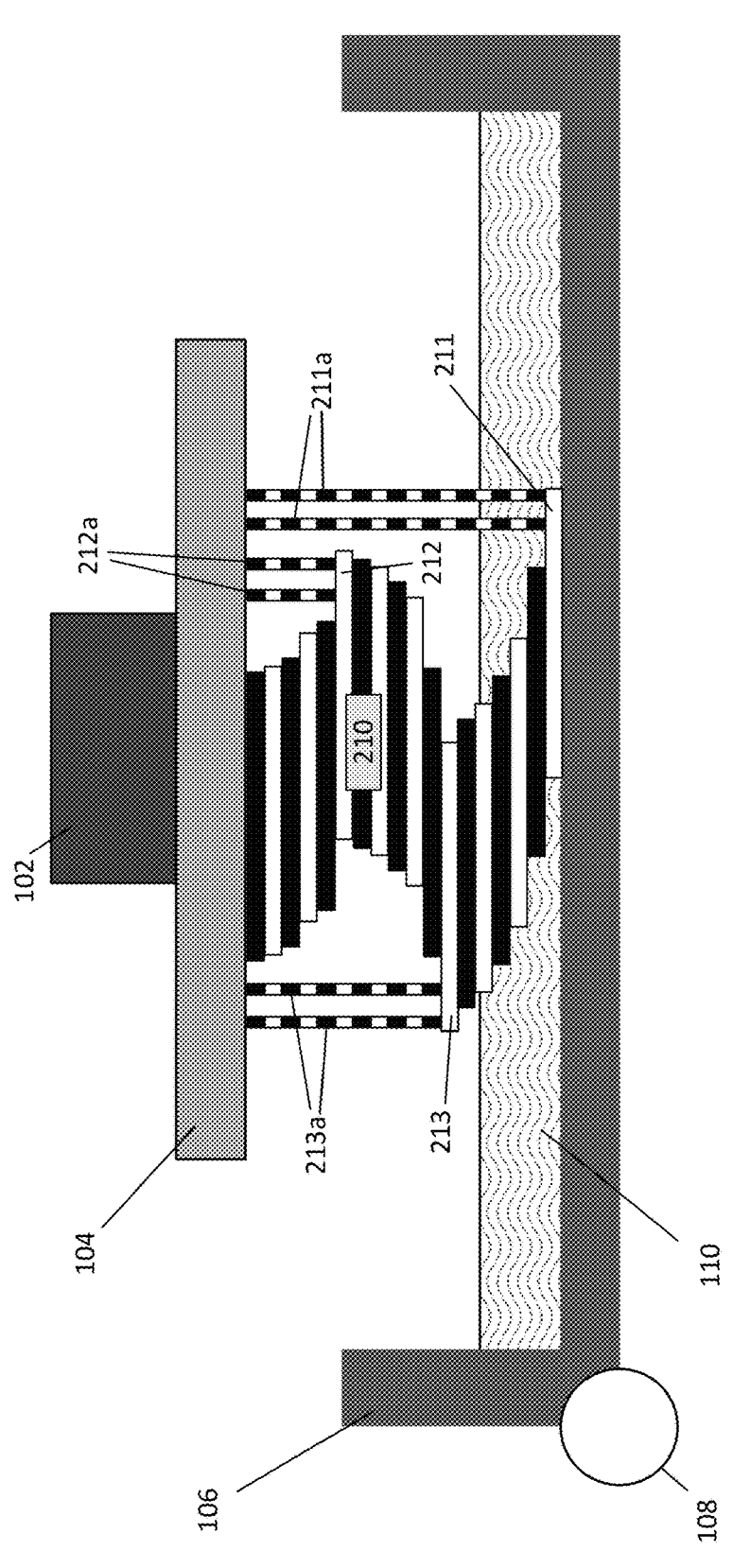

In the example of FIGS. 1A-1B, forces applied to a layer during fabrication may include forces applied when separating the layer from the container 102 and/or gravitational forces pulling a layer downward. An illustrative part 210 including layers 212, 213 and 214 is shown in FIGS. 2A-2B as being fabricated by the stereolithographic printer 100 of FIGS. 1A-1B. While the height of the layers of the part 210 are, as with part 112 of FIGS. 1A-1B, not illustrated to scale, the layers in FIGS. 2A-2B are illustrated with a lower thickness compared with those in FIGS. 1A-1B for clarity.

As may be noted from FIG. 2A, the layers 211, 212 and 213 of part 210 each overhang earlier formed layers of the part. During fabrication, if the part 210 is formed as illustrated any one or more of these layers may be deformed or otherwise damaged during fabrication. For instance, in some cases the force of the movement during separation of the layer from the container may tear the newly formed layer causing a portion of the part or layer to remain adhered to the container. For example, in the state shown in FIG. 2A wherein the layer 211 has just been formed and is in contact with the container 106, the act of separating the layer 211 from the container may cause damage to the layer (and in some cases to other layers as well) because the layer 211 overhangs the previously formed layer (the layer immediately above layer 211 in FIG. 2A). In many cases, the layers of the part 210 may be tens of microns in thickness, and so applying a force to the part through a layer such as layer 211 may easily cause deformation of the structure of the part, particularly the rightmost part which extends beyond the previously formed layer (i.e., the overhang).

FIG. 2B depicts the part 210 of FIG. 2A again being fabricated by the stereolithographic printer 100, wherein a support structure comprising support pillars 211a, 212a and 213a is also being fabricated. While various different types of support structure shapes may be envisioned, as can be seen from the example of FIG. 2B, when the layers 211, 212 and 213 are formed, they are formed in contact with respective support pillars 211a, 212a and 213a. The support pillars may provide sufficient mechanical support so as to avoid deformation of these layers when the part is separated from the container 106 (via some relative motion of the part and container, as discussed above).

While support structures can provide mechanical support to a part during fabrication, the support structures need to be removed from the part after fabrication is complete. This can lead to surface defects such as pits or bumps, that remain on the part after removal of the support structure.

The inventors have recognized and appreciated that some locations on a part that connect to a support structure may be more or less desirable than other locations. For instance, a support connection point on a flat region on a part may be more desirable than a support connection point on an edge of the part. After fabrication, for instance, it may be comparatively easier to remove and clean up the point where the support structure connected to the flat compared with the point of the support structure that was connected to the edge. For example, it may be difficult to remove the support structure completely from the edge of the part without damaging the shape of the edge or leaving a small piece of the support structure present on the edge. Other examples of less desirable locations for a support connection point may include corners and/or areas of high mesh density. In the latter case, it may be difficult to remove the support completely from an area of high detail on a part without removing at least some of that detail.

The inventors have recognized and appreciated techniques for generating support structures that connect to a part while avoiding connecting to regions that include one or more less desirable features, such as the examples described above. In some embodiments, a suitable computing device may be configured to identify regions of the surface of a part that contain less desirable surface features, and exclude and/or disfavor those regions for connection to a support structure when generating the support structure. In some embodiments, regions containing less desirable surface features can be defined by a user, such as via a graphical user interface displaying a three-dimensional (3D) representation of a part to be fabricated. Such a definition may be performed by the user interacting with the 3D representation (e.g., drawing on the surface or otherwise highlighting certain regions) and/or may be performed programmatically by the user inputting criteria for the regions (e.g., by selecting numerical boundaries) and the computing system automatically identifying the regions based on the user's input.

To illustrate examples of surface features that are less desirable to connect to support connection points, FIGS. 4A-4E depict the surface features of various three-dimensional models, according to some embodiments. Hereinafter, surface features that are less desirable to connect to support connection points may be referred to as "no support" regions, although it will be appreciated that connecting such regions to a support structure may not be prohibited per se, and may rather simply be disfavored, and the "no support" term is not intended to suggest otherwise.

Figure 4A:
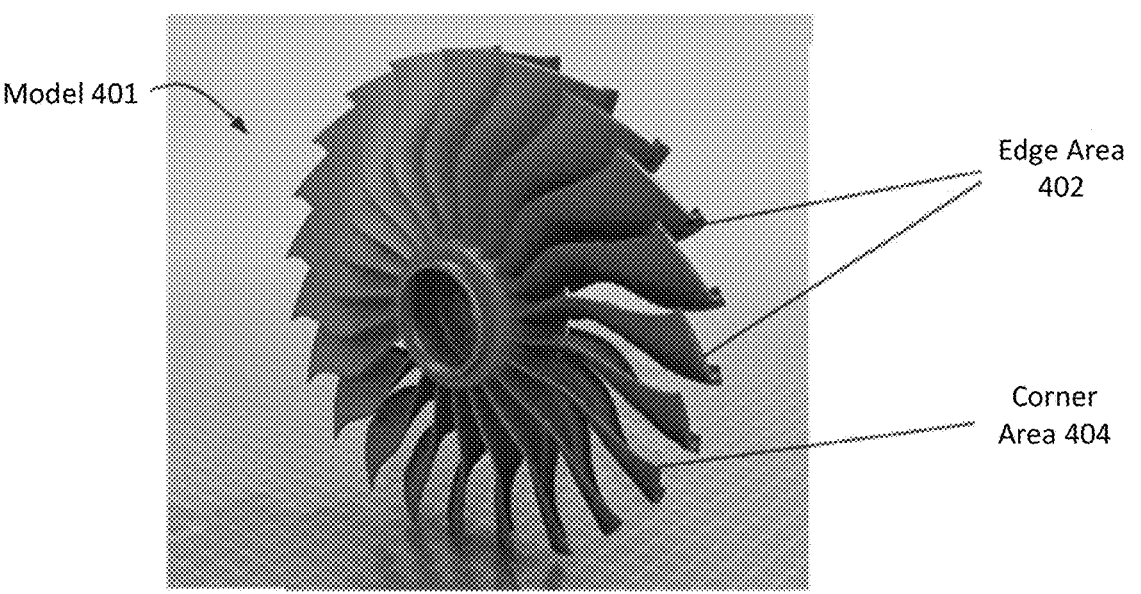
FIGS. 4A-4E illustrate examples of surface features of a three-dimensional model, according to some embodiments.
Figure 4B:
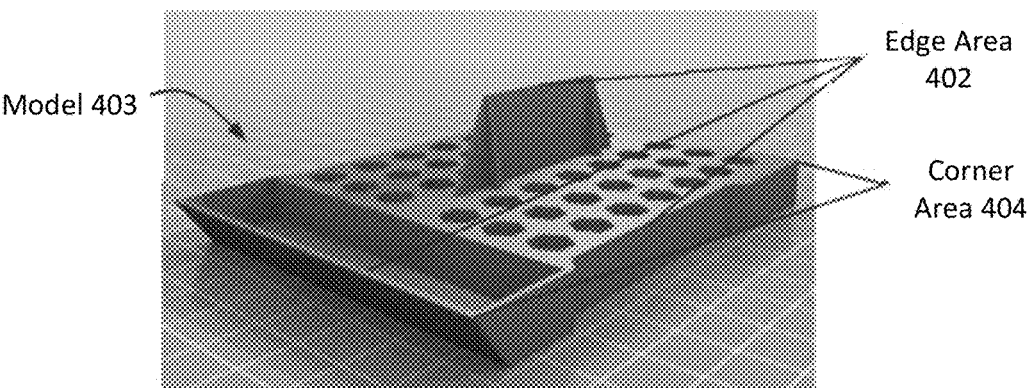

An example of one type of "no support" regions is an edge area, such as edge area 402 in FIGS. 4A-4B. An edge area includes an edge at which two surfaces of the three-dimensional model meet, and the proximate areas surrounding the edge. If support tips are placed within the edge areas, the supports may not be strong enough to hold on to the three-dimensional model during printing. Further, removing supports placed within the edge areas during post-processing can damage the printed part by removing chunks of the edge area with the supports. For printed parts that require smooth surface finishes such as the blades of the turbine model 401 in FIG. 4A, removing supports at the edge areas can leave undesired artifacts on the edge.

Corner areas such as corner areas 404 in FIGS. 4A-4B, are another example of a "no support" region. A corner area includes a corner in the three-dimensional model at which two or more edges of the three-dimensional model meet, and the proximate areas surrounding the corner. Removing supports located inside the corner area can cause chunks from the corner area to break away with the support, or leave undesired artifacts on the surface finish.

In some embodiments, a computer device may be configured to identify the existence and/or extent of edge and/or corner regions during print preparation based on input from a user. For instance, the user can provide a customized definition for edge or corner areas during print preparation (e.g., as input to the print preparation program). For example, a user can define an edge area by specifying a range of angle at which two surfaces meet, and a threshold distance from the edge. For example, for a particular print job, the user can set an edge area to be any surface areas within 0.5 cm of an edge, and an edge is defined as a line at which two surfaces meet at an angle smaller than 45 degrees. Similarly, the user can define a corner area by specifying a range of angles at which two or more edges meet, and a threshold distance from the meeting point. For example, the user can set a corner area to be any surface areas within 0.5 cm of a corner, and the corner is defined as a point at which two or more edges meet at smaller than 45 degrees to each other, and the definition for an edge can be where two surfaces meet at an angle smaller than 45 degrees to each other.

Figure 4C:
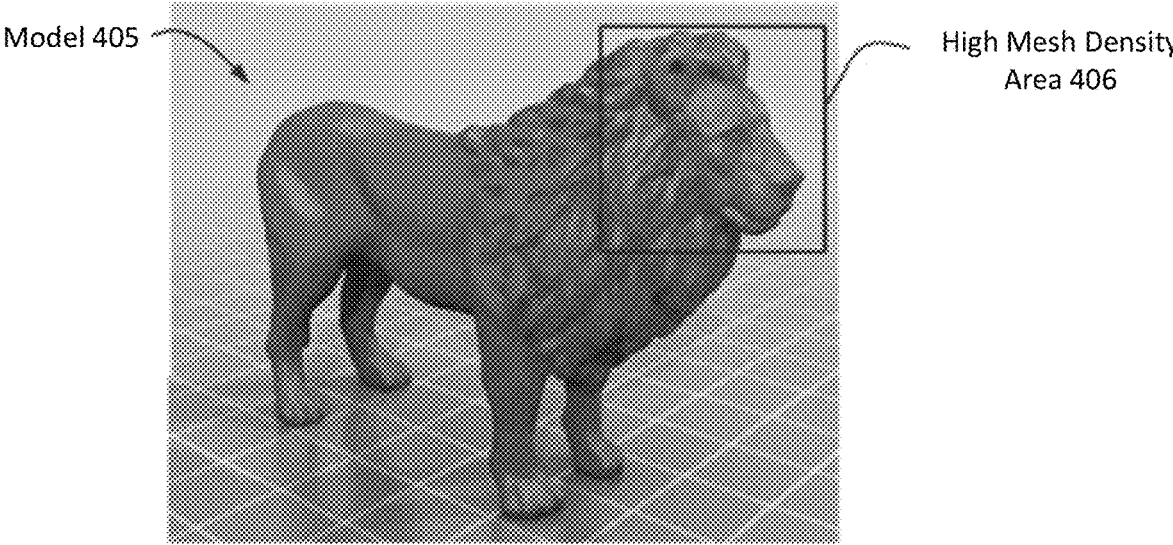

Another example of a "no support" region is a high mesh density area, such as high mesh density area 406 in FIG. 4C. In some embodiments, a three-dimensional model is represented by triangulated meshes such as those represented in the STL format. A high mesh density area indicates complex surface geometry (e.g., a high number of small features), and is usually associated with fine details and geometric contrasts such as facial areas. Generating supports inside high mesh density areas can leave undesired artifacts after the supports are removed. For example, in FIG. 4C, the high mesh density area 406 is associated with a lion figure's face and mane. During print preparation, the user can provide customized definition for high mesh density area, such as specifying a threshold number of triangles per unit area. Surface areas on the model that exceed such threshold are flagged as high mesh density areas, and may be excluded from generating or hosting support structures.

Figure 4E:
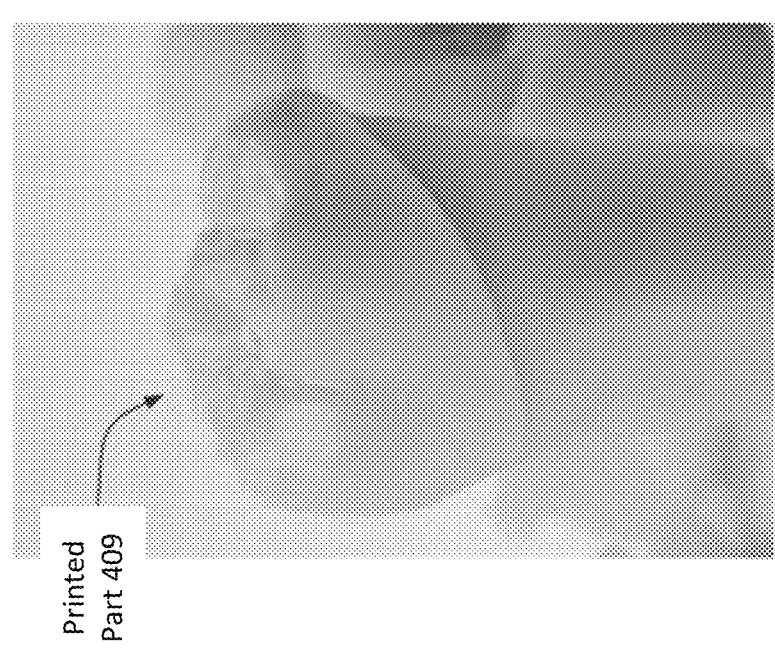
Figure 4D:
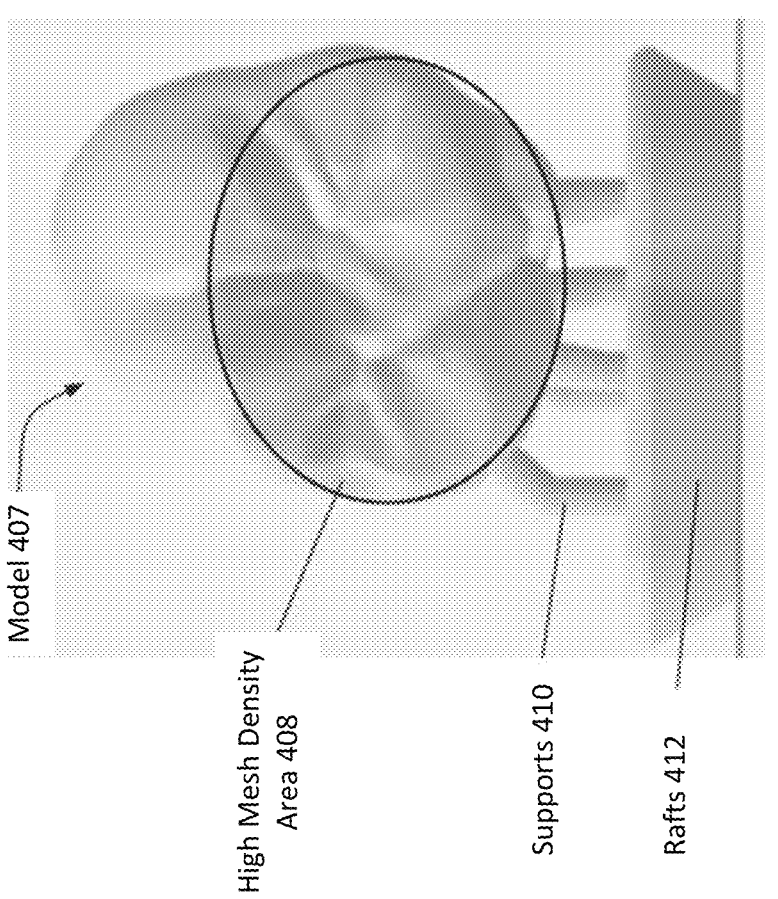

FIGS. 4D-4E show a three-dimensional model 407 of a dental crown and a 3D printed crown 409 from the model 407. The top of the crown is associated with a high mesh density area 408, and supports are excluded from being placed on the top of the 3D model 407. As a result, supports

410 are generated from the side of the model 407. In some embodiments, the side surfaces of the dental crown should also be free from supports to maintain a smooth finish, as they should fit with surrounding teeth. The user can lower the threshold for high mesh density areas such that the supports are only generated from the smooth inner surface of the dental crowns, where the inner surface have mesh density below the set threshold.

The analysis of the three-dimensional models, such as determining the existence and location of edge, corner, and high mesh density areas, is performed on a global scope (e.g., by analyzing an entire three-dimensional model) before slicing of the models.

The above examples are provided as illustrative cases and are by no means exhaustive. In general, surface features that are less desirable to connect to support connection points may include surface areas that are not suitable for generating or hosting support structures, and a print preparation program (e.g., PreForm® by Formlabs®) may be configured to allow users to manually specify one or more "no-support" regions on the three-dimensional models, or automatically identify one or more "no support" surface regions without user input (e.g., by identifying edges and/or corners).

FIGS. 5A-5E illustrate examples of user interfaces for importing a three-dimensional model and generating supports for the three-dimensional model, according to some embodiments.

Figure 5B:
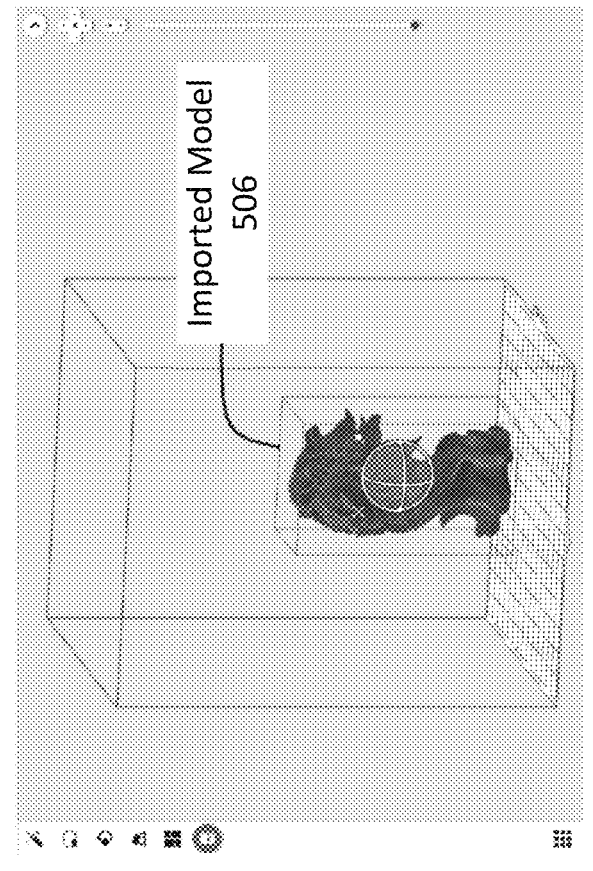
FIGS. 5A-5E illustrate examples of user interfaces for importing a three-dimensional model and generating supports for the three-dimensional model, according to some embodiments.
Figure 5A:
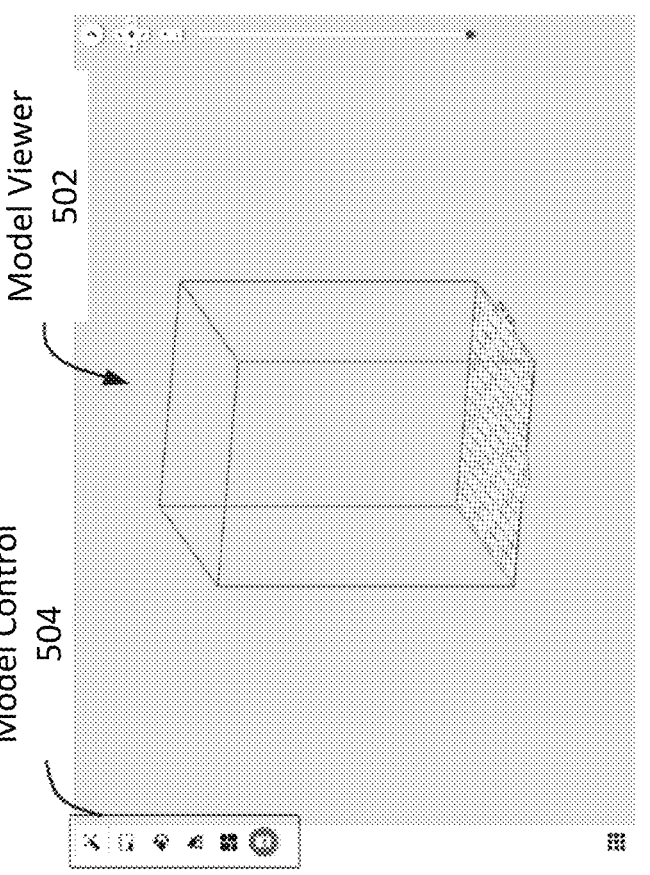

FIG. 5A shows the user interface of a print process software (e.g., PreForm by Formlabs). The print processing software UI includes a model control 504 for importing, editing, and printing a 3D model, and a model viewer 502 for viewing an imported 3D model.

FIG. 5B shows that in response to a user importing a 3D model into the print process software, a model 506 is displayed within the model viewer 502. To prepare the imported model 506 for printing, the user selects support affordance 505 from the model control 504. In response to selecting the support affordance 505, a support control panel 508 appears, as shown in FIG. 5C.

The support control panel 508 includes a number of configuration settings for the imported model 506, including editing supports, adding supports, removing supports, changing support size, etc.

Figure 5D:
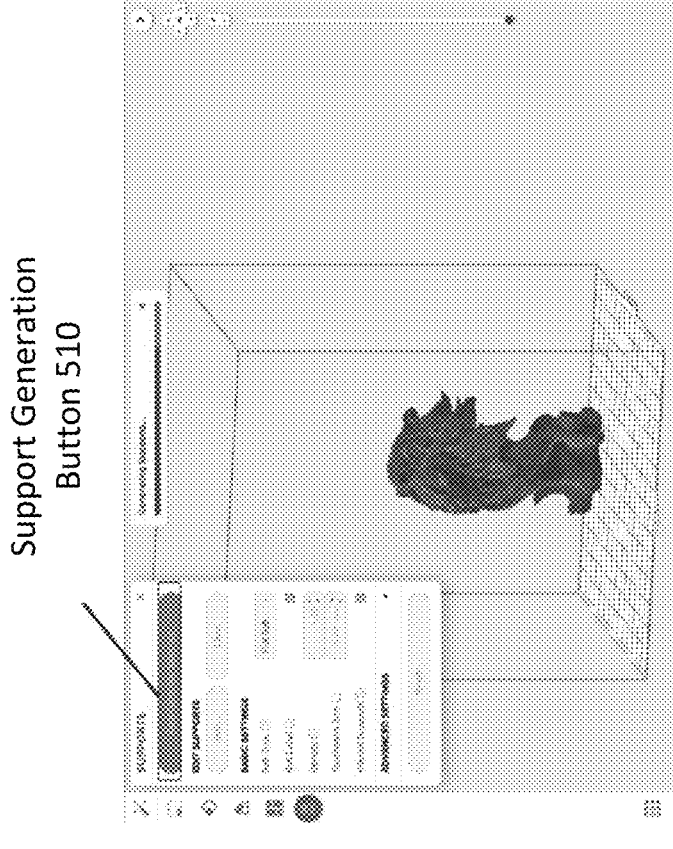
Figure 5C:
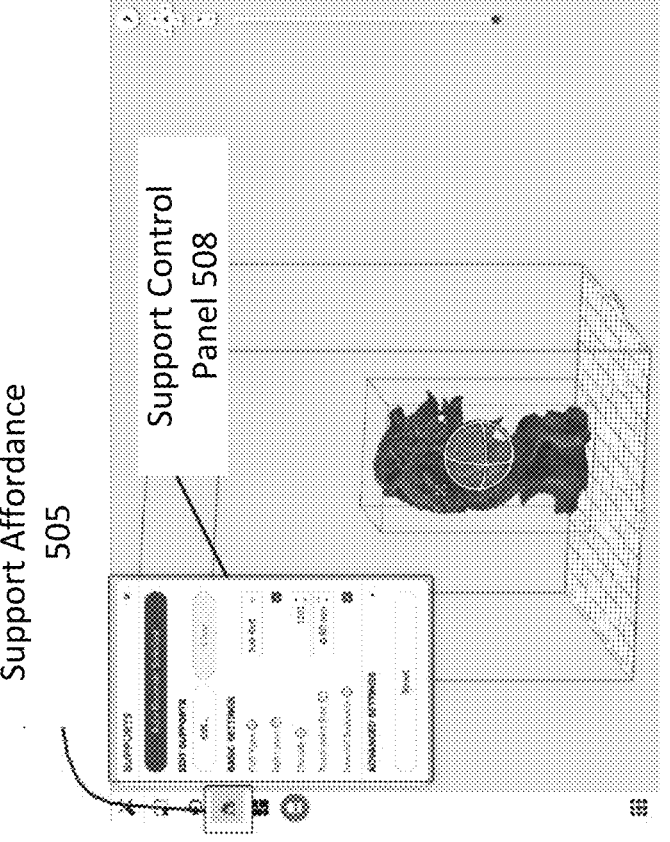
Figure 5E:
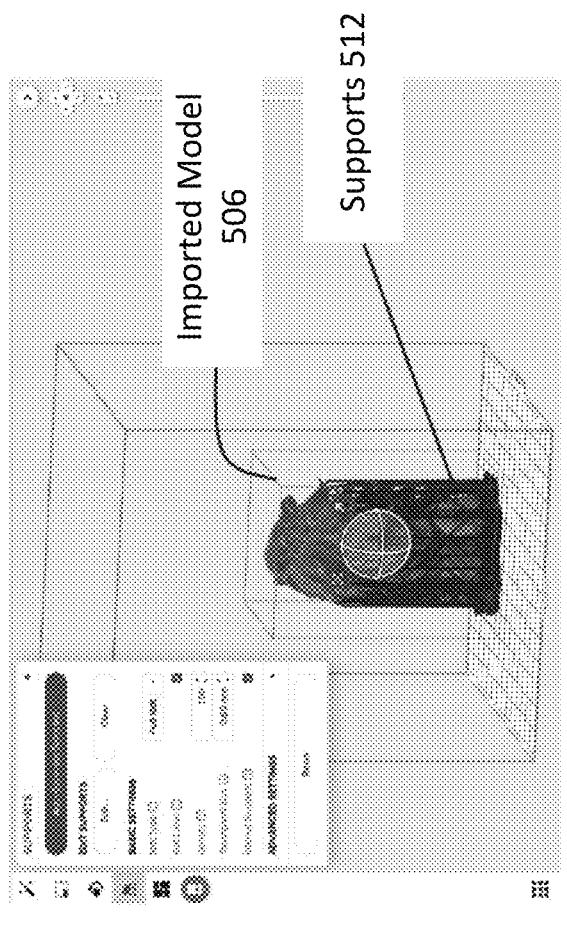

The support control panel 508 includes a fully automatic "one-click" solution for preparing supports for printing (e.g., support generation button 510 of FIG. 5D). As described in FIGS. 4A-4E and the related descriptions, the print process software can be configured to avoid generating supports at certain areas (e.g., edge areas, corner areas, or high mesh density areas) of the model. For example, as shown in FIG. 5E, the program automatically generates supports for the 3D model 506, in response to the user selecting the support generation button 510, without placing any support in the high mesh density areas of the model, such as round the face and mane of the lion model.

Although FIG. 5D only describes automatic support generation, in some embodiments, user can manually determine one or more "no support" regions on the 3D model. For example, the support control panel 508 can include an affordance that allows a user to mark one or more "no support" regions on the model; or conversely, surface areas that should be exclusively used for support generation. In response to the user's selection, supports are only generated at the designated areas on the three-dimensional model.

Figures 6A, 6B, 6C:
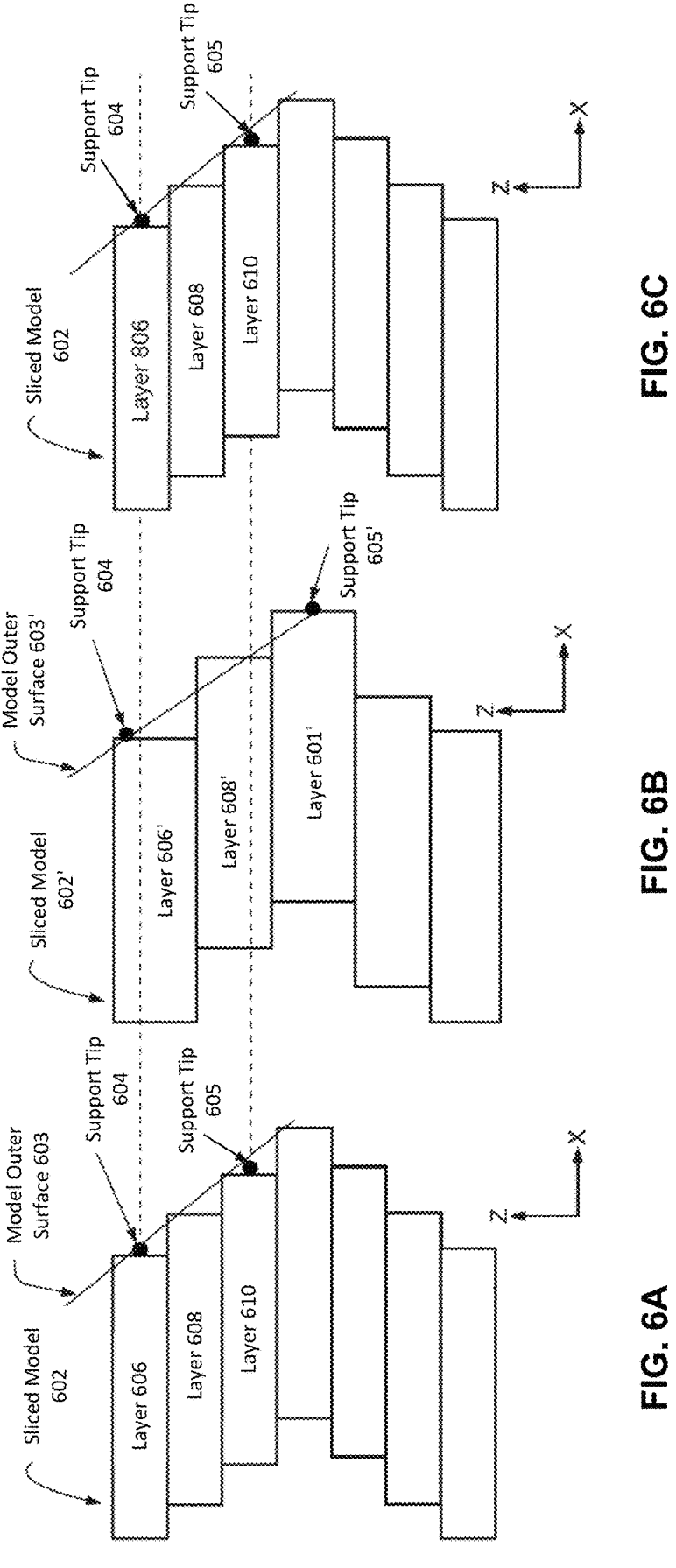
FIGS. 6A-6C illustrate an example of adaptive support tip generation, according to some embodiments.

FIGS. 6A-6C illustrate an exemplary process of adaptive support generation, according to some embodiments. Adaptive support generation allows quick generation and relocation of support tips on a 3D model in response to changes in slicing settings (e.g., change of layer thickness). Without adaptive support generation, a change in slicing settings would require generating a new set of support tips, which requires a large computation cost.

FIG. 6A shows a side view of a portion of a 3D model after a first slicing operation (e.g., performed by a print process software such as PreForm® by Formlabs®), in which the 3D model is converted to a sliced model 602 with multiple layers including layer 606, 608, and 610. Two support tips are placed on a model outer surface 603 of the sliced model 602 at locations 604 and 605 (e.g., in response to the user selecting the support generation button 510 in FIG. 5D).

Next, as shown in FIG. 6B, the user changes the slicing setting and the new layer thickness of the sliced model 602' is greater than that of the original sliced model 602. Traditionally, the support tip locations will have to be recalculated as they are layer-specific, and the layers have changed due to the different slicing setting. However, support tip calculation is a resource-intense process and can take a significant amount of time to accomplish. To improve user experience when changing slicing settings, adaptive support generation is used. When adaptive support generation is enabled, when support tips are first generated (e.g., in sliced model 602), each tip is not only generated at a specific point (root point), but is also configured to be movable within a predefined area (or volume) with respect to the model surface around the root point. When the layer thickness changes, the support tips can be quickly relocated to another point on the new outer surface that is within the predefined area (or volume), without having to recalculate support tip locations. As a result, when adaptive support generation is activated, it will take longer for the supports to be generated the first time, but there is significant time saving when new supports need to be generated when layer thickness changes.

As shown in FIG. 6B, at the new slicing setting, the support tip 604 moves upward to support tip 604', and the support tip 605 moves downward to support tip 605'. The locations of the support tip 604' and 605' are determined by the intersection of the new model outer surface 603' and the predefined areas (or volume) that is support tip is allowed to move in the original slicing setting.

As shown in FIG. 6C, when the user changes the layer setting again to revert to the slicing setting in FIG. 6A, instead of having to recalculate the support tip locations, the program can directly retrieve the support tip locations from the previous settings.

FIG. 7A is a flowchart illustrating an example process 700 for generating support structures for a three-dimensional model subject to automatic support tip generation criterion, according to some embodiments. For convenience, the process 700 will be described as being performed by a computer program, such as a print process software (e.g., PreForm® by Formlabs® as illustrated in FIGS. 5A-5E). After the support structures are generated, the computer program controls an additive fabrication device (e.g., a stereolithography printer, selective laser sintering printer, fused deposition modelling printer, etc.) to produce the three-dimensional model and the associated support structures from source materials.

As a first step, the computer program displays a three-dimensional model in a user interface (e.g., in the model viewer 502 of FIG. 5A, or PreForm®'s home user interface) (702). The user interface has a dimension corresponding to that of the additive fabrication device for reference.

Next, the computer program receives a first user input (e.g., the user clicks on the "support" icon in PreForm®) for assigning one or more values to one or more parameters of the support structure (e.g., support geometry, support density, touchpoint size, internal support existence, raft existence, etc.) (704). In some embodiments, the support parameters have default values, and the user can use these default values without making further adjustment.

After receiving the first user input for support parameter values, the computer program receives a second user input for automatically generating support structures for the three-dimensional model (e.g., the user clicks on the "support generation button" 510 of FIG. 5D) (706).

In response to receiving the second user input (708), the computer program determines one or more surface regions of the three-dimensional model that satisfy support tip generation criteria (710). The support tip generation criteria include a first support generation criterion that is satisfied if the one or more surface regions do not include an edge area, a corner area, or a high mesh density area, as described in FIGS. 4A-4B and the related descriptions.

The computer program then generates the support structure with support tips contacting the one or more surface regions (712). In some embodiments, the support structure includes a base (or a raft), support trunk standing on the base, and support tips connecting surface of the three-dimensional model to the support trunk.

Finally, the computer program displays the support structure and the three-dimensional model in the user interface (714).

FIG. 7B is a flowchart illustrating an example process 701 for generating support structures for a three-dimensional model subject to manually-entered support tip generation criterion, according to some embodiments. For convenience, the process 700 will be described as being performed by a computer program, such as a print process software (e.g., PreForm® by Formlabs® as illustrated in FIGS. 5A-5E). After the support structures are generated, the computer program controls an additive fabrication device (e.g., a stereolithography printer, selective laser sintering printer, fused deposition modelling printer, etc.) to produce the three-dimensional model and the associated support structures from source materials.

The computer program first displays a three-dimensional model in a user interface (716). This step is similar to that described in Step 702 of FIG. 7A.

Next, the computer program receives a first user input for assigning one or more values to one or more parameters of a support structure (718). This step is similar to that described in Step 704 of FIG. 7A.

Instead of automatically generating support structure as described in FIG. 7A, the computer program receives a second user input for selecting a point on surface of the three-dimensional model for generating a support tip of the support model (720). For example, the user may enter the second user input by moving a mouse and clicking on a mouse button when the cursor is at designated locations on the surface of the three-dimensional model, or using a touch screen to select the points on the surface of the three-dimensional model.

In response to receiving the second user input (722), in accordance with a determination that the selected point is located in a surface region that satisfies support tip generation criteria (724), the computer program marks the selected point as a valid location for a generating support (726) (e.g., placing a dot of a different color on the three-dimensional model). For example, the selected point may satisfy the support tip generation criteria if the surface region in which the selected point is located does not include an edge area, a corner area, a high mesh density area, etc. as described in FIGS. 4A-4E.

On the other hand, in according with a determination that the selected point is located in the region that does not satisfy the support tip generation criteria (728), the computer program forgoes making the selected point as a valid location for generating support tip (730), and generates a message on the user interface indicating that the support tip cannot be generated at the selected point (732).

In some embodiments, the computer program allows users to mark areas on the surface of the three-dimensional model that should not be used for generating support tips, and automatically generating support tips on areas outside of the marked areas.

In some embodiments, the one or more parameters of the support structure include a support tip size, and the threshold smoothness value is dependent on user-assigned value for the support tip size.

In some embodiments, the support generation criteria include a second support generation criterion that is satisfied in accordance with a determination that the one or more regions do not include a corner area.

In some embodiments, the support generation criteria include a third support generation criterion that is satisfied in accordance with a determination that the one or more regions do not include a high mesh density area.

In some embodiments, the high mesh density area comprises one or more facial features.

In some embodiments, the three-dimensional includes a dental crown model.

Figure 3:
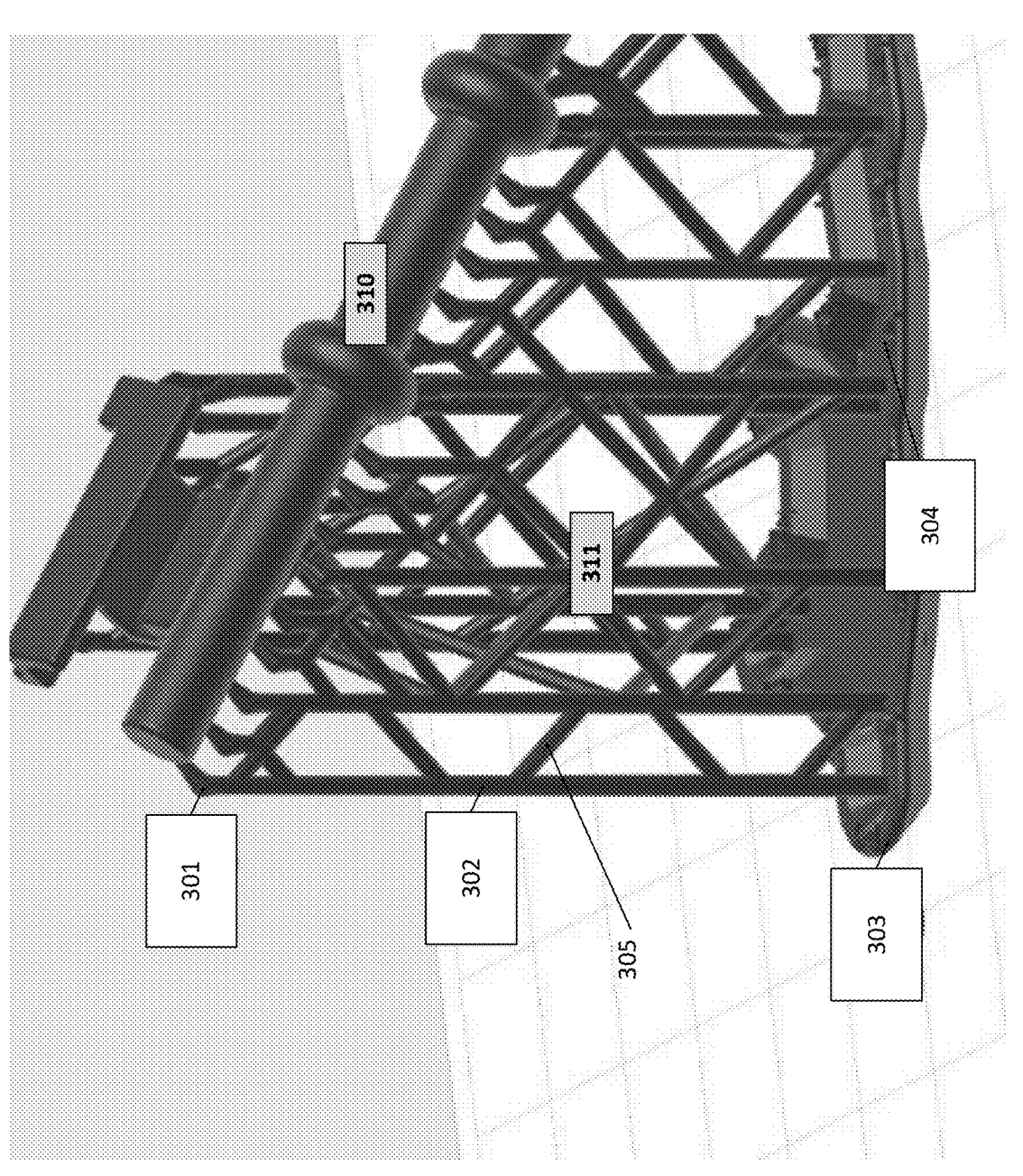
FIG. 3 illustrates an example of a support structure, according to some embodiments.

Another example of a support structure is illustrated in FIG. 3, which depicts a cylindrical part 310 fabricated on a support structure 311. The support structure includes pillars 302, being vertical features that provide a connection between the top and bottom of the support structure. In the example of FIG. 3, the support pillars 302 are coupled to the part 310 via support tips 301, which have an orientation that may be determined based on the surface normal of the part at the point of contact. In some embodiments, support tips serve to connect surface of printed parts to the rest of the support structure (e.g., support pillars). Support tips have smaller cross-sectional areas compared to support pillars, and are therefore easier to break away from the surface of the printed part. Techniques for generating support tips are described further in U.S. Pat. No. 9,183,325, titled "Additive Fabrication Support Structures," which is hereby incorporated by reference in its entirety. The support pillars 302 are also connected to a raft structure 303, which is formed on the build platform and may, for instance, provide a rigid structure on which the remaining support structure may be formed. In the example of FIG. 3, the raft 303 includes text 304 that identifies the part 310.

Furthermore in the example of FIG. 3, some of the support pillars 302 are connected to one or more of the other support pillars via one or more trusses 305. The trusses may provide additional structural support to a support pillar and inhibit the pillar from flexing or otherwise deforming during fabrication. In some cases, a truss may aid in distributing force between multiple support pillars.

Figure 8:
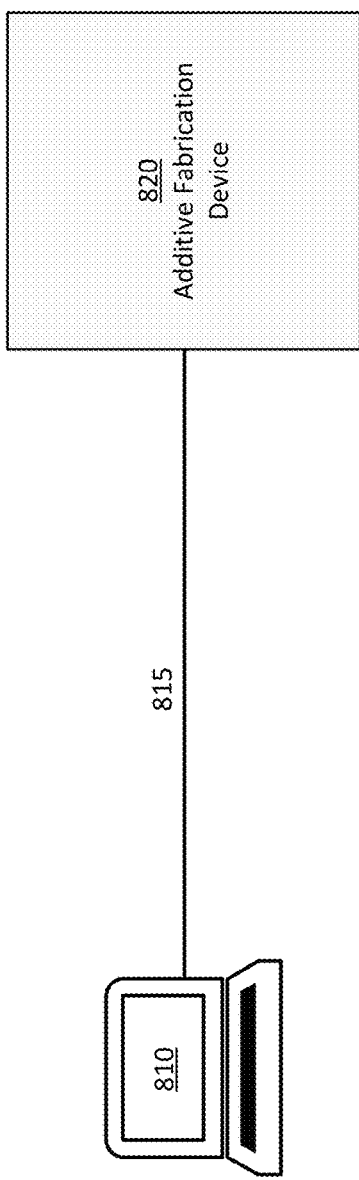
FIG. 8 is a block diagram of a system suitable for practicing aspects of the invention, according to some embodiments.

FIG. 8 is a block diagram of a system suitable for practicing aspects of the invention, according to some embodiments. System 800 illustrates a system suitable for generating instructions to perform additive fabrication by an additive fabrication device and subsequent operation of the additive fabrication device to fabricate a part. For instance, instructions to fabricate a part and a support structure as described by the various techniques above may be generated by the system and provided to the additive fabrication device. Various parameters associated with generating a support structure may be stored by system computer system 810 and accessed when generating instructions for the additive fabrication device 820.

It will be appreciated that any of the above-described techniques to generating a support structure may be combined in any suitable manner and in any suitable order. According to some embodiments, computer system 810 may execute software that generates instructions for fabricating a part using additive fabrication device. Said instructions may then be provided to an additive fabrication device, such as additive fabrication device 820, via link 815, which may comprise any suitable wired and/or wireless communications connection. In some embodiments, a single housing holds the computing device 810 and additive fabrication device 820 such that the link 815 is an internal link connecting two modules within the housing of system 800.

Figure 9:
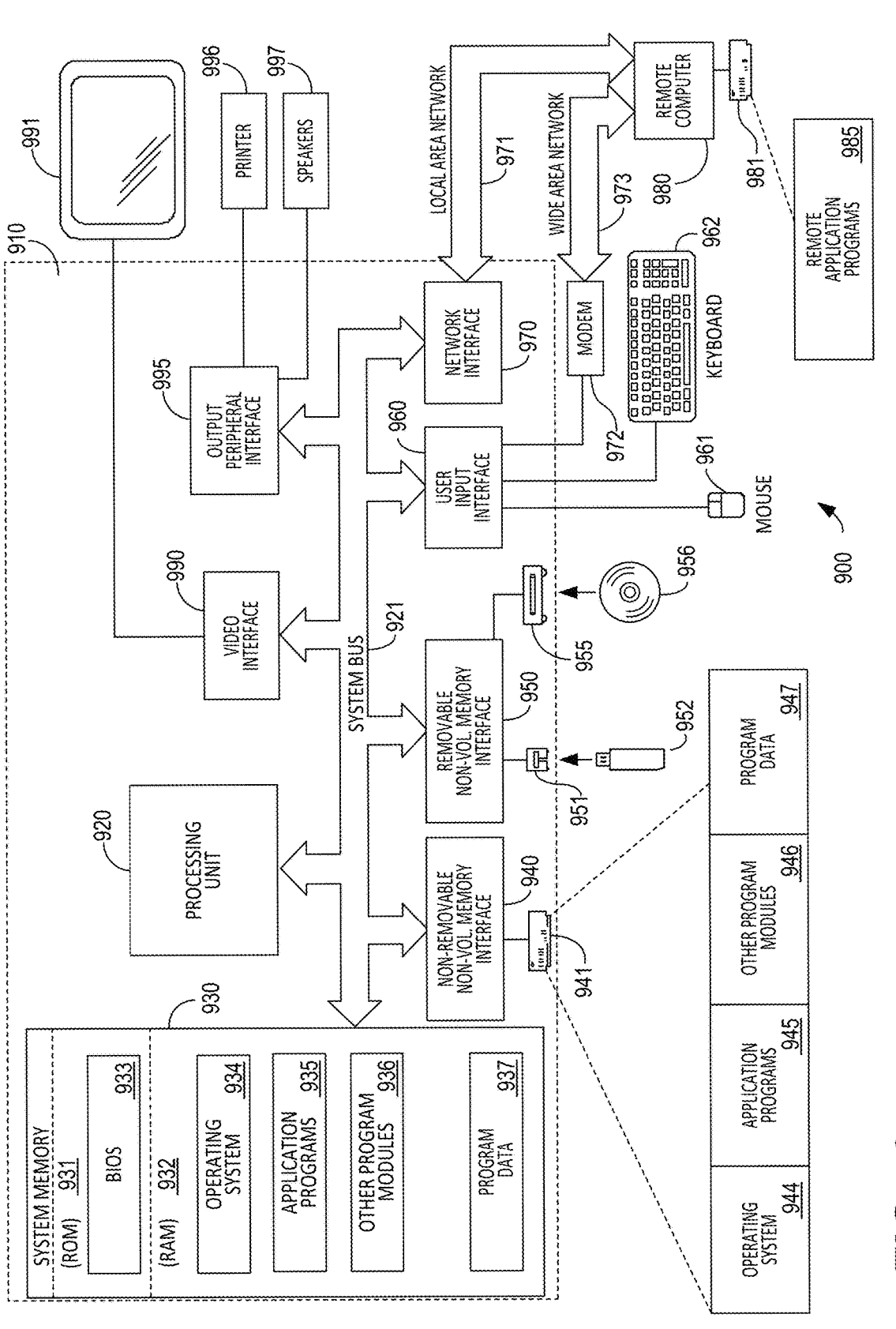
FIG. 9 illustrates an example of a suitable computing system environment on which the technology described herein may be implemented, according to some embodiments.

FIG. 9 illustrates an example of a suitable computing system environment 900 on which the technology described herein may be implemented. For example, computing environment 900 may form some or all of the computer system 810 shown in FIG. 8. The computing system environment 900 is only one example of a suitable computing environment and is not intended to suggest any limitation as to the scope of use or functionality of the technology described herein. Neither should the computing environment 900 be interpreted as having any dependency or requirement relating to any one or combination of components illustrated in the exemplary operating environment 900.

The technology described herein is operational with numerous other general purpose or special purpose computing system environments or configurations. Examples of well-known computing systems, environments, and/or configurations that may be suitable for use with the technology described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The technology described herein may also be practiced in distributed computing environments where tasks are performed by remote processing devices that are linked through a communications network. In a distributed computing environment, program modules may be located in both local and remote computer storage media including memory storage devices.

With reference to FIG. 9, an exemplary system for implementing the technology described herein includes a general purpose computing device in the form of a computer 910. Components of computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 910. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936, and program data 937.

The computer 910 may also include other removable/non-removable, volatile/nonvolatile computer storage media. By way of example only, FIG. 9 illustrates a hard disk drive 941 that reads from or writes to non-removable, nonvolatile magnetic media, a flash drive 951 that reads from or writes to a removable, nonvolatile memory 952 such as flash memory, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media discussed above and illustrated in FIG. 9, provide storage of computer readable instructions, data structures, program modules and other data for the computer 910. In FIG. 9, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies. A user may enter commands and information into the computer 910 through input devices such as a keyboard 962 and pointing device 961, commonly referred to as a mouse, trackball or touch pad. Other input devices (not shown) may include a microphone, joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A monitor 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 9. The logical connections depicted in FIG. 9 include a local area network (LAN) 971 and a wide area network (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in the remote memory storage device. By way of example, and not limitation, FIG. 9 illustrates remote application programs 985 as residing on memory device 981. It will be appreciated that the network connections shown are exemplary and other means of establishing a communications link between the computers may be used.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. However, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a non-transitory computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software," when used herein, are used in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

According to some aspects, a computer-implemented method is provided to generate support structure for a three-dimensional model for fabrication in an additive fabrication device. The computer-implemented method includes: displaying the three-dimensional model in a user interface having a dimensional corresponding to a dimension of the additive fabrication device; receiving a first user input for assigning one or more values to one or more parameters of the support structure; receiving a second user input for automatically generating the support structure for the three-dimensional model; and in response to receiving the second user input: determining one or more surface regions of the three-dimensional model that satisfy support tip generation criteria, wherein the support tip generation criteria include a first support tip generation criterion that is satisfied if the one or more surface regions each has at least a threshold smoothness value; generating the support structure with support tips contacting the one or more surface regions; and displaying the support structure and the three-dimensional model in the user interface.

According to some aspects, at least one non-transitory computer-readable medium is provided comprising instructions that, when executed by at least one processor, perform a method of: displaying the three-dimensional model in a user interface having a dimensional corresponding to a dimension of the additive fabrication device; receiving a first user input for assigning one or more values to one or more parameters of the support structure; receiving a second user input for automatically generating the support structure for the three-dimensional model; and in response to receiving the second user input: determining one or more surface regions of the three-dimensional model that satisfy support tip generation criteria, wherein the support tip generation criteria include a first support tip generation criterion that is satisfied if the one or more surface regions each has at least a threshold smoothness value; generating the support structure with support tips contacting the one or more surface regions; and displaying the support structure and the three-dimensional model in the user interface.

According to some aspects, a computer-implemented method is provided of generating a support structure for a three-dimensional model to be fabricated by an additive fabrication device, the method comprising displaying, using at least one processor, the three-dimensional model in a user interface, receiving a first user input for assigning one or more values to one or more parameters of the support structure, receiving a second user input for automatically generating the support structure for the three-dimensional model based on the one or more values to the one or more parameters, and in response to receiving the second user input determining, using the at least one processor, one or more surface regions of the three-dimensional model that satisfy support tip generation criteria, wherein the support tip generation criteria include a first support tip generation criterion that is satisfied if the one or more surface regions do not include an edge area, generating, using the at least one processor, the support structure with support tips contacting the one or more surface regions and not other surface regions, and displaying, using the at least one processor, the support structure and the three-dimensional model in the user interface.

According to some aspects, a method is provided of generating support structure for a three-dimensional model for fabrication in an additive fabrication device, comprising displaying the three-dimensional model in a user interface having a dimensional corresponding to a dimension of the additive fabrication device, receiving a first user input for assigning one or more values to one or more parameters of the support structure, receiving a second user input indicating selection of a point on surface of the three-dimensional model for generating a support tip of the support structure, and in response to receiving the second user input in accordance with a determination that the selected point is located in the region that does not satisfy the support tip generation criteria forgoing marking the selected point as a valid location for generating the support tip, and generating a message on the user interface indicating that the support tip cannot be generated at the selected point.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A computer-implemented method of generating a support structure for an object to be fabricated by an additive fabrication device, the object represented by a 3D model, the method comprising:

using at least one processor:
  identifying one or more surface regions of the 3D model that satisfy one or more support tip generation criteria, wherein the one or more support tip generation criteria include a first support tip generation criterion that is satisfied if the one or more surface regions do not include an edge area, and a second support tip generation criterion that is satisfied if the one or more surface regions have a mesh density that is below a threshold number of polygons per unit area;
  generating a 3D model representing a support structure comprising one or more support tips that contact the one or more surface regions of the 3D model, wherein the support structure does not contact surface regions of the 3D model other than the one or more surface regions that satisfied the one or more support tip generation criteria; and
  displaying the support structure and the 3D model in a user interface.

2. The method of claim 1, further comprising generating instructions that, when executed by the additive fabrication device, cause the additive fabrication device to fabricate the object and the support structure according to the 3D model representing the object and the 3D model representing the support structure.

3. The method of claim 2, further comprising providing the instructions to the additive fabrication device.

4. The method of claim 1, further comprising:
  displaying, using the at least one processor, a 3D model of the object in the user interface;
  assigning one or more values to one or more parameters of the support structure based on first user input; and
  receiving second user input, wherein generating the support structure is performed in response to receiving, and is based on, the second user input.

5. The method of claim 4, wherein the one or more parameters of the support structure include a support tip size.

6. The method of claim 1, wherein the one or more support tip generation criteria further include a third support tip generation criterion that is satisfied if the one or more surface regions do not include a corner area.

7. The method of claim 1, wherein the one or more support tips connect the one or more surface regions to the rest of the support structure, and wherein the one or more support tips have a smaller cross-sectional area than the rest of the support structure.

8. The method of claim 1, wherein the second support tip generation criterion is satisfied if the one or more surface regions have a mesh density that is below a threshold number of triangles per unit area.

9. The method of claim 1, further comprising:
  receiving a second user input indicating that the support structure is to connect to a first point on the surface of the 3D model;
  determining, in response to receiving the second user input, that the first point is not a location within the one or more surface regions of the 3D model that satisfied the one or more support tip generation criteria; and
  displaying an alert via the user interface indicating that the first point is not a valid location.

10. At least one non-transitory computer-readable medium comprising instructions that, when executed by at least one processor, perform a method of generating a support structure for an object to be fabricated by an additive fabrication device, the object represented by a 3D model, the method comprising:
  identifying one or more surface regions of the 3D model that satisfy one or more support tip generation criteria, wherein the one or more support tip generation criteria include a first support tip generation criterion that is satisfied if the one or more surface regions do not include an edge area, and a second support tip generation criterion that is satisfied if the one or more surface regions have a mesh density that is below a threshold number of polygons per unit area;
  generating a 3D model representing a support structure comprising one or more support tips that contact the one or more surface regions of the 3D model, wherein the support structure does not contact surface regions of the 3D model other than the one or more surface regions that satisfied the one or more support tip generation criteria; and displaying the support structure and the 3D model in a user interface.

11. The at least one non-transitory computer-readable medium of claim 10, wherein the method further comprises generating instructions that, when executed by the additive fabrication device, cause the additive fabrication device to fabricate the object and the support structure according to the 3D model representing the object and the 3D model representing the support structure.

12. The at least one non-transitory computer-readable medium of claim 11, wherein the method further comprises providing the instructions to the additive fabrication device.

13. The at least one non-transitory computer-readable medium of claim 10, wherein the method further comprises:

displaying, using the at least one processor, a 3D model of the object in the user interface;

assigning one or more values to one or more parameters of the support structure based on first user input; and receiving second user input, wherein generating the support structure is performed in response to receiving, and is based on, the second user input.

14. The at least one non-transitory computer-readable medium of claim 13, wherein the one or more parameters of the support structure include a support tip size.

15. The at least one non-transitory computer-readable medium of claim 10, wherein the one or more support tip generation criteria further include a third support tip generation criterion that is satisfied if the one or more surface regions do not include a corner area.

16. The at least one non-transitory computer-readable medium of claim 10, wherein the one or more support tips connect the one or more surface regions to the rest of the support structure, and wherein the one or more support tips have a smaller cross-sectional area than the rest of the support structure.

17. The at least one non-transitory computer-readable medium of claim 10, wherein the second support tip generation criterion is satisfied if the one or more surface regions have a mesh density that is below a threshold number of triangles per unit area.

18. The at least one non-transitory computer-readable medium of claim 10, wherein the method further comprises:

receiving a second user input indicating that the support structure is to connect to a first point on the surface of the 3D model;

determining, in response to receiving the second user input, that the first point is not a location within the one or more surface regions of the 3D model that satisfied the one or more support tip generation criteria; and displaying an alert via the user interface indicating that the first point is not a valid location.

* * * * *